Jan. 28, 1958 J. J. BILLHIMER, SR 2,821,027
ADJUSTABLE RULE GAUGE FOR CABINET PULLS AND DOOR HANDLES
Filed July 26, 1954 2 Sheets-Sheet 1
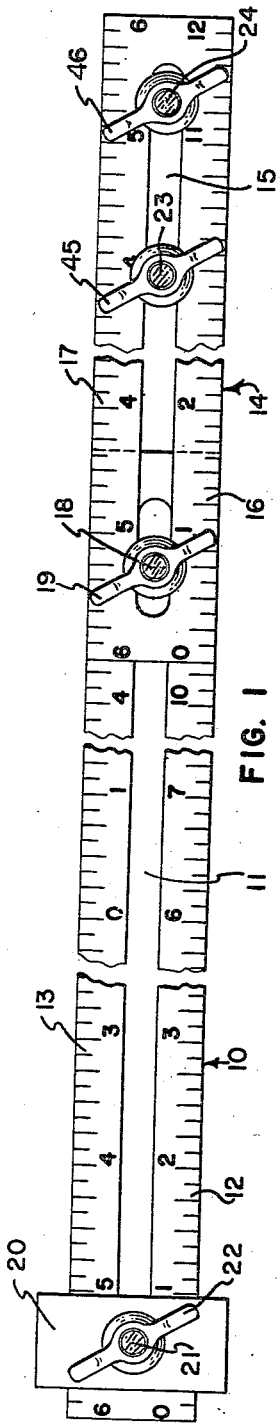
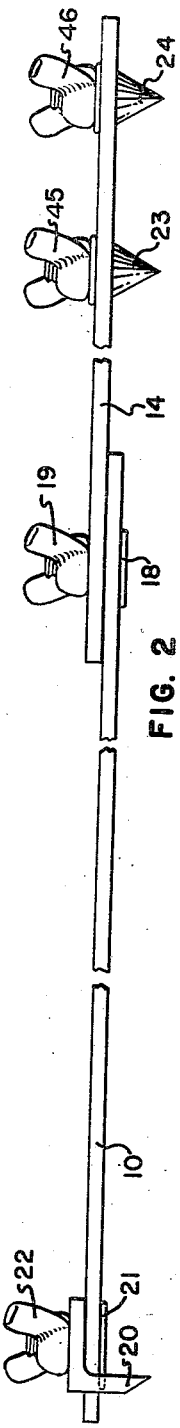
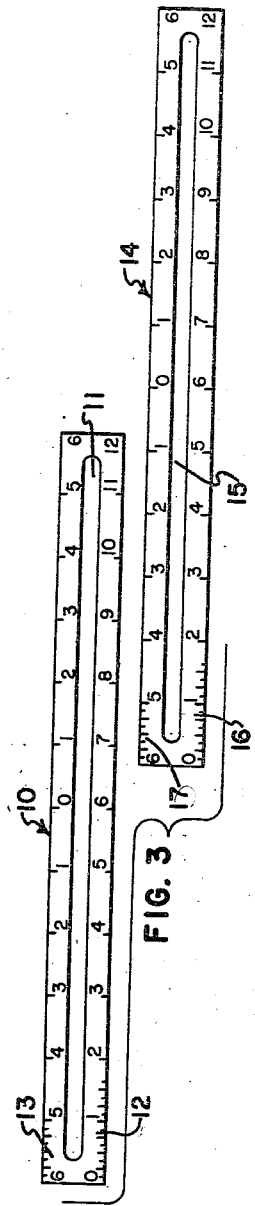
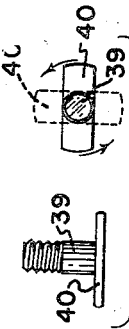
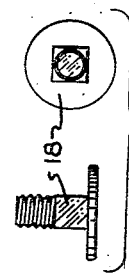
JOSEPH JOHN BILLHIMER, Sr.
INVENTOR.
BY Robert C. Comstock
HIS ATTORNEY Jan. 28, 1958     J. J. BILLHIMER, SR     2,821,027
ADJUSTABLE RULE GAUGE FOR CABINET PULLS AND DOOR HANDLES
Filed July 26, 1954            2 Sheets-Sheet 2
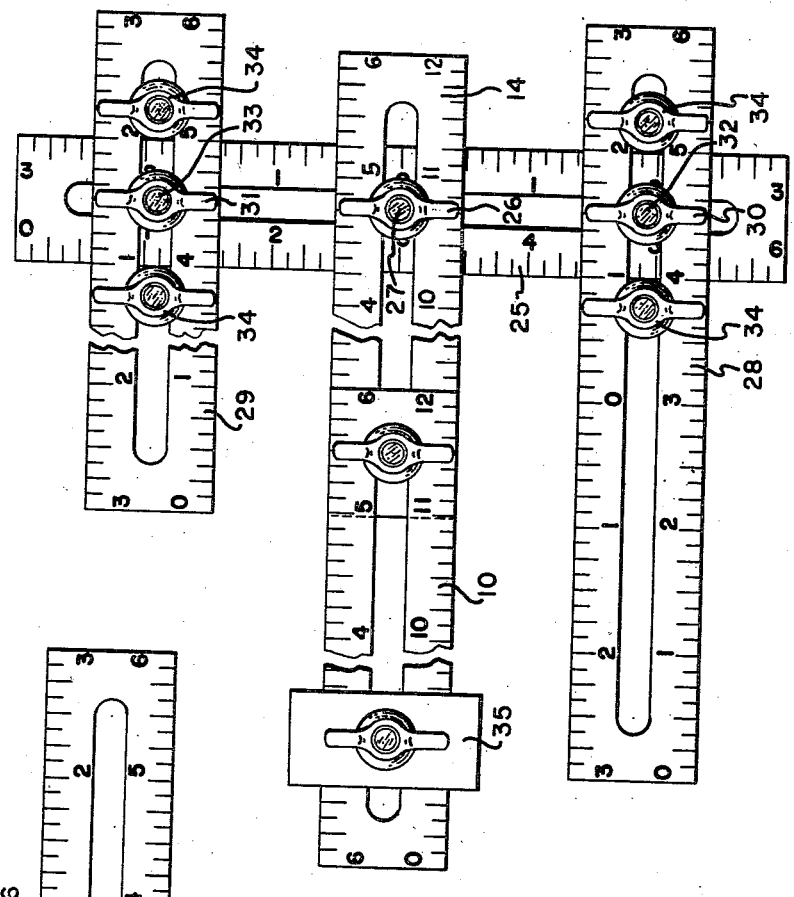
JOSEPH JOHN BILLHIMER, Sr.
*INVENTOR.*
BY Robert C. Comstock
HIS ATTORNEY United States Patent Office 2,821,027
Patented Jan. 28, 1958

2,821,027
ADJUSTABLE RULE GAUGE FOR CABINET PULLS AND DOOR HANDLES

Joseph John Billhimer, Sr., Rivera, Calif.

Application July 26, 1954, Serial No. 445,690

7 Claims. (Cl. 33—189)

This invention relates to an adjustable rule gauge for use by carpenters in the installation of cabinet pulls and door handles.

It is an object of my invention to provide such a device which is simple in construction and use and which expedites and simplifies the installation of pulls and handles and which results in their perfect alignment with each other.

A further object is to provide such a device which is completely adjustable and which is capable of being extended to any desired length or size and which is one embodiment is capable of use for installing and aligning the handles of adjacently positioned doors.

Another object of my invention is to provide such a device which is an accurate rule as well as a gauge, with the rule being usable alone as well as in setting the gauge. My device is novel in the sense that its dimensions may be used for measurement purposes and it is further provided with measuring indications for use in connection with the gauge.

With my device, no pattern, blueprint, model, sample, jig or guess work is necessary. My device is compact, fast and versatile in use and is similar in construction to conventional rules and gauges with which workers are familiar. My device also provides indentations which serve to hold the end of the drill bit in place for drilling the screw holes.

It is a further object of my invention to provide wing nut fastening and marking devices which are capable of quick change, and bolts which will not slip out of their proper position when they are tightened.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

Fig. 1 is a top plan view of a preferred embodiment of my invention, with some of the parts broken away to shorten the length;

Fig. 2 is a similar side elevational view of the same;

Fig. 3 is a top plan view of the two rules;

Fig. 4 is a side elevational and top plan view of one form of bolt used in my device;

Fig. 5 comprises similar views of another form of bolt;

Fig. 6 comprises similar views of a third form of bolt;

Fig. 7 is a front elevational view of a drawer, showing my device in use;

Fig. 8 is a top plan view of another embodiment of my invention, partly broken;

Fig. 9 is a top plan view of a modificaiton of my invention;

Fig. 10 is a sectional view of the reference member, taken on line 10—10 of Fig. 9;

Fig. 11 is a side elevational view of the reference member.

A preferred embodiment which has been selected to illustrate my invention comprises a relatively flat elongated twelve inch rule 10. Rule 10 is provided with a centrally disposed longitudinal slot 11. A twelve inch scale 12 is marked off on one side of rule 10 beneath slot 11, starting with 0 at the left and progressing to 12, with inch and fracional inch markings in between. A second twelve inch scale 13 is provided on the same surface of rule 10 above slot 11, starting with 0 at the center and progressing to 6 at each end of rule 10. A second twelve inch rule 14 is similarly provided with a slot 15, bottom scale 16 and top scale 17 which are similar to those of rule 10.

Rules 10 and 14 are attached to each other by a bolt 18 (shown in Fig. 5), which is provided with a square shank which extends through slots 11 and 15 and a screw threaded end on which is mounted a wing nut 19. Wing nut 19 may be loosened to permit rules 10 and 14 to be moved with respect to each other and then tightened to prevent further movement. The square shank of bolt 18 slides along slots 11 and 15 but prevents any crawling or movement of the bolt during the loosening or tightening of wing nut 19.

An L-shaped member 20 is attached to rule 10 by a bolt 21 (shown in Fig. 4), which is provided with a square shank which extends through slot 11 and a screw threaded end on which is mounted a wing nut 22. The square shank of bolt 21 is shorter than that of bolt 18, since it extends through only one rule instead of two. The L-shaped member 20 is mounted so that one portion extends parallel to rule 10 along the top thereof on which the scales are marked and the other portion depends downwardly at a right angle from the bottom of rule 10 as shown in Fig. 2 of the drawings. The downwardly depending portion is pointed and acts to grip the edge of a drawer to serve as a reference for measuring or positioning the drawer pulls.

Two marking devices 23 and 24 are attached to rule 14. The bottoms of marking devices 23 and 24 are conical in shape, with the points extending downwardly at a right angle from rule 14. Integral square shanks are slidably mounted in slot 15 and integral screw threaded upper ends carry wing nuts 45 and 46, which may be loosened to permit movement of marking devices 23 and 24 and tightened to fix them at the desired location.

In use, L-shaped member 20 is normally disposed adjacent the end of rule 10 and marking devices 23 and 24 are normally disposed adjacent the opposite end of rule 14. Marking devices 23 and 24 are set the desired distance from each other and rules 10 and 14 are set to space them the desired distance from L-shaped member 20. The two types of scales provided on rules 10 and 14 are helpful in making quick settings.

After the device has been set, L-shaped member 20 is hooked over the edge of the drawer and marking devices 23 and 24 pressed sharply into the wood. They make indentations which mark the proper location of the drawer pulls and which also serve to hold the drill bit in place as it drills the screw holes. It is also possible to use the end of rule 10 and the end of rule 14 as a stop and reference or to use any of the markings on the scales as a reference.

It may be noted that both of the marking devices 23 and 24 are adjustable with respect to rule 14 and that rules 10 and 14 are adjustable with respect to each other. All adjustments are easily accomplished by the wing nuts and accuracy of the setting is assured by the square shanked bolts. The bolts can also be easily removed if desired. My device is extendable to any size desired by the attachment of additional rules.

If two dimensional location of the pulls is desired, rule 14 can be moved to extend at a right angle to rule 10. Rule 10 can then be used for measurement in one dimension and rule 14 for measurement in the second dimension.

It may be noted that in addition to the scales provided on rules 10 and 14, further measurements are possible with my device, since both rules 10 and 14 are exactly 1" wide and 1/8" thick. Slots 11 and 15 are 1/4" wide and the portions of rules 10 and 14 on each side of slots 11 and 15 are 3/8" wide.

Another embodiment which is shown in Fig. 8 of the drawings is designed for use in placing handles, knobs or other opening devices on adjacent double doors. It comprises a pair of rules 10 and 14 identical with those shown in Figs. 1–3. Extending transversely to rule 14 adjacent the end thereof is a six inch rule 25, which is adjustably mounted by a wing nut 26 and bolt 27. Extending transversely to rule 25 and parallel to rules 10 and 14 are two six inch rules 28 and 29, which are attached to rule 25 by wing nuts 30 and 31 and bolts 32 and 33. Each of rules 28 and 29 is provided with two wing nut mounted marking devices 34 corresponding to marking devices 23 and 24.

All of the rules are provided with double scales and are of the same dimensions as rules 10 and 14 except as to length. An L-shaped member 35 similar to member 20 is provided for use as a stop and measuring reference.

In use, this device is placed so that its rules 10 and 14 extend along the space between the doors. Rule 25 is preferably adjusted so that the zero on its zero-center scale is set at the center of rule 14. Rules 28 and 29 are set the desired distance from rule 14 and the marking devices 34 are set the desired distance from each other. My device is then placed in the proper position and the marking devices 34 pressed sharply into the wood to locate and align both door handles at one time. The handles are thus in line with each other as well as with all other door handles marked with the device.

Referring to Fig. 9 of the drawings, I may provide a modified form of stop or reference 36 which does not protrude beyond the sides of the rule. Such member may be provided with a pair of downwardly extending members 37 and 38 which extend along the longitudinal axis of reference member 36 instead of along one end like L-shaped member 20. Such construction is shown in Figs. 10 and 11 of the drawings.

Another modification is shown in Fig. 6 of the drawings, showing an alternative form of bolt which may be used to provide even quicker separation and attachment of the rules. The bolt comprises a round shank 39 having a screw threaded end portion and a narrow base 40, the width of which is smaller than the width of slots 11 and 15. The length of base 40 is greater than the width of slots 11 and 15. In use, base 40 extends transversely to slot 11 or 15 to hold the bolt in place. If the wing nut is loosened slightly, base 40 can be rotated one-quarter turn in either direction and then lifted upwardly through slot 11 or 15 to remove the bolt. Attachment of the bolt is accomplished by a simple reversal of this procedure.

I claim:

1. A device of the class described comprising an elongated twelve inch rule, a six inch rule removably and adjustably attached to said twelve inch rule and extending transversely thereto, a pair of six inch rules removably and adjustably attached to said six inch rule and extending substantially parallel to said twelve inch rule and a pair of marking devices removably and adjustably positioned on each of said pair of six inch rules, each of said rules having a longitudinal slot extending for substantially the entire length thereof, and bolts attaching said rules together, said bolts being slidably mounted in said slots, with bases disposed beneath said rules and wing nut screw threadedly mounted adjacent the top of said bolts.

2. The subject matter of claim 1, all of said bolts having square shanks to prevent displacement thereof upon tightening of said wing nuts and each of said rules having marked thereon a pair of scales in inches and fractions thereof, one scale below and one above said slot, one of said scales starting with zero at one end of said rules and the other starting with zero at the center of said rules.

3. The subject matter of claim 1, each of said rules having marked thereon a pair of scales in inches and fractions thereof, one scale below and one above said slot, one of said scales starting with zero at one end of said rules and the other starting with zero at the center of said rules, said bolts having bases longer than said slots but narrower than said slots, said bases being removable through said slots when aligned therewith longitudinally and unremovable when aligned transversely thereto.

4. A device of the class described comprising an elongated rule, a second rule removably and adjustably attached to said elongated rule and extending transversely thereto, a pair of third rules removably and adjustably attached to said second rule and extending substantially parallel to said elongated rule, and a pair of marking devices removably and adjustably positioned on each of said pair of third rules, each of said rules having a longitudinal slot extending for substantially the entire length thereof, and bolts attaching said rules together, said bolts being slidably mounted in said slots, with bases disposed beneath said rules and wing nuts screwthreadedly mounted adjacent the top of said bolts.

5. The subject matter of claim 1, each of said rules being one inch wide and one-eighth inch thick, said slot being one-fourth inch wide and the portions of said rules on each side of said slot being three-eighths inch wide.

6. The subject matter of claim 1, each of said rules having marked thereon a pair of scales in inches and fractions thereof, one scale below and one above said slot, one of said scales starting with zero at one end of said rules and the other starting with zero at the center of said rules.

7. A device of the class described comprising an elongated rule, a second rule removably and adjustably attached to said elongated rule and extending transversely thereto, a pair of third rules removably and adjustably attached to said second rule and extending substantially parallel to said elongated rule, and a pair of marking devices adjustably positioned on each of said pair of third rules, each of said rules having a longitudinal slot extending for substantially the entire length thereof, and fastening members attaching said rules together, said fastening members being slidably mounted in said slots.

References Cited in the file of this patent

UNITED STATES PATENTS

| | | |
|---|---|---|
| 164,008 | Kirkpatrick | June 1, 1875 |
| 1,009,214 | Backstrom | Nov. 21, 1911 |
| 1,431,522 | Hayman | Oct. 10, 1922 |
| 1,554,062 | Zelenski | Sept. 15, 1925 |
| 1,668,684 | Koubek | May 8, 1928 |
| 2,185,808 | Grennon | Jan. 2, 1940 |
| 2,729,895 | Backstrom | Jan. 10, 1956 |

FOREIGN PATENTS

| | | |
|---|---|---|
| 12,265 | Great Britain | 1886 |
| 219,691 | Switzerland | June 1, 1942 |
| 293,723 | Switzerland | Dec. 16, 1953 |